United States Patent [19]

Watts

[11] 4,042,253
[45] Aug. 16, 1977

[54] WEIGHT TRANSFER SYSTEM FOR COUPLING A GANG PLOW TO A TOWING VEHICLE

[76] Inventor: Glen A. Watts, P.O. Box 462, Jerome, Idaho 83338

[21] Appl. No.: 719,964

[22] Filed: Sept. 2, 1976

[51] Int. Cl.² .......................................... B62D 53/00
[52] U.S. Cl. .............................. 280/405 B; 280/476 R
[58] Field of Search ........... 280/476 R, 476 A, 405 R, 280/405 A, 406 R; 214/130 R, 86 R; 172/443, 444

[56] References Cited

U.S. PATENT DOCUMENTS

| | | | |
|---|---|---|---|
| 2,785,615 | 3/1957 | McCall | 172/443 |
| 2,786,589 | 3/1957 | Garrett | 172/443 X |
| 3,679,230 | 7/1972 | Farrant | 280/405 B |
| 3,692,331 | 9/1972 | Vegors | 280/405 R X |
| 3,974,880 | 8/1976 | Filan | 172/443 |

Primary Examiner—Robert R. Song
Assistant Examiner—R. Schrecengost
Attorney, Agent, or Firm—Oliver D. Olson

[57] ABSTRACT

A weight transfer system for coupling a two-way gang plow to a towing vehicle eliminates lifting of the rear end of the towing vehicle due to the weight of the plow assembly when the plow assembly is raised for transportation. An elongated cable is connected at its forward end to the tow bar of the towing vehicle, at a pivot point above and coaxial with the pivot towing connection of the plow tongue, and at its rearward end to the main support frame at a point above the point of joinder of the main support frame and a pivoting linkage which connects the main support frame to the wheel of the plow. A hydraulic cylinder rotates the linkage to raise the main support frame, thereby tensioning the cable and rotating the support frame angularly upward for towing. The tension force in the cable in turn causes a moment at the tow bar counteracting the lifting force at the rear end of the towing vehicle caused by the weight of the plow assembly.

6 Claims, 4 Drawing Figures

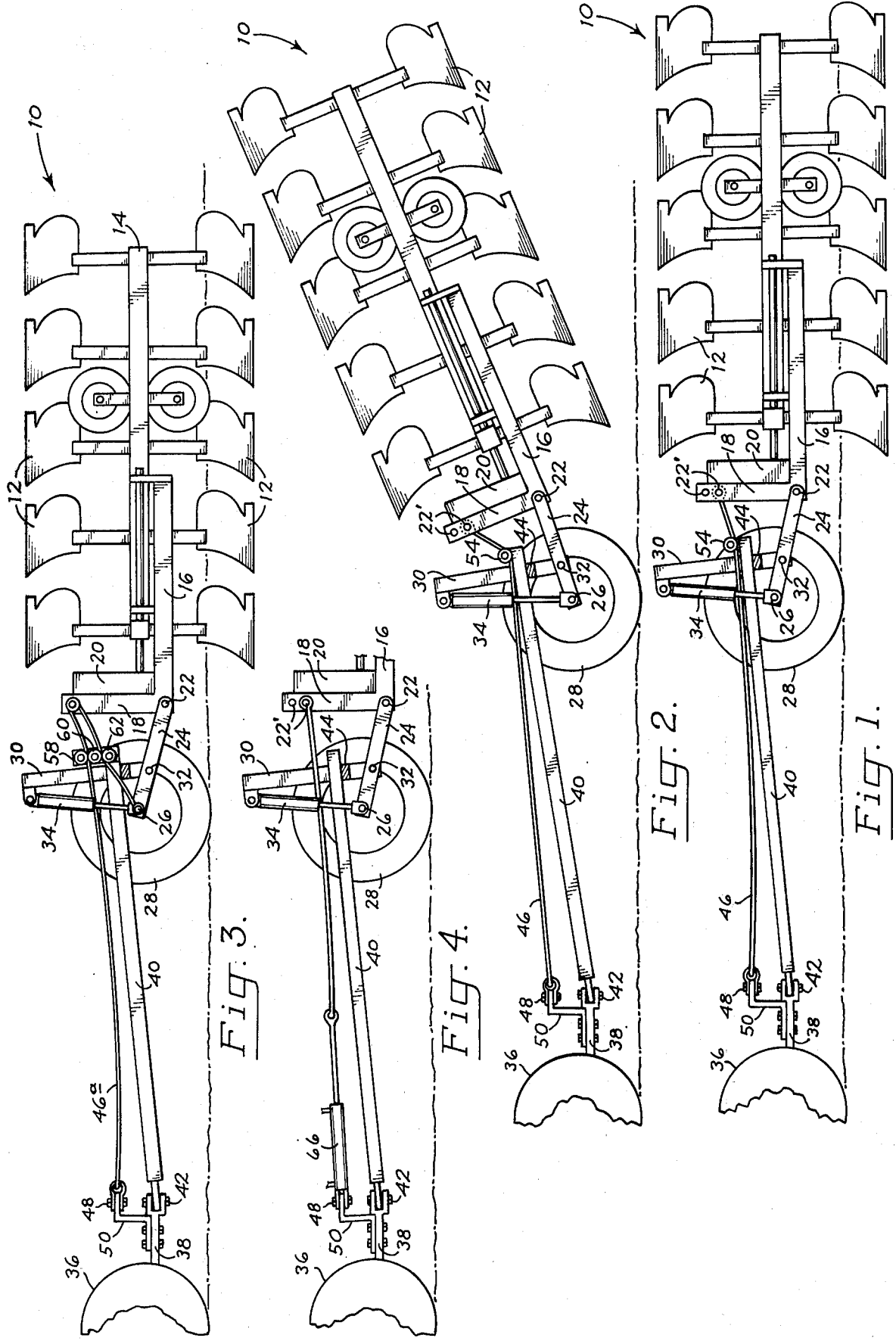

WEIGHT TRANSFER SYSTEM FOR COUPLING A GANG PLOW TO A TOWING VEHICLE

BACKGROUND OF THE INVENTION

This invention relates to a system for coupling a towable ground-working implement to a towing vehicle, and in particular to such a system which transfers the weight of the implement, when it is in a raised transport position, to the entire towing vehicle, rather than to the rear end only, to minimize vertical lift at the rear of the vehicle.

There are many types of ground-working implements that are attachable to a tractor by means of a conventional three-point connection. Such a connection includes a pair of laterally spaced, lower support arms and a central, upper, longitudinally extensible arm by which the implement may be lifted upward out of contact with the ground for transport. Tractors provided with this type of three-point connection characteristically have sufficient forward weight to support the implement in transport condition without the latter causing sufficient lightening of the forward end to result in loss of steering traction.

On the other hand, other types of tractors are not provided with the above described three-point connection, but rather merely with a draw bar pivot connection. Accordingly, it has been the practice heretofore to provide a coupling between such a tractor connection and a three-point connection on a ground-working implement, by means of an interposed assembly of a wheeled frame provided with a rearwardly facing three-point connection for the implement and a forwardly extending tongue for connection to the tractor draw bar.

However, elevation of the implement at the three-point connection results in the wheeled frame functioning as a lever, developing an upward force at the forward end of the tongue and hence at the rear end of the tractor, sufficient to cause loss of driving traction.

SUMMARY OF THE INVENTION

In its basic concept, the weight transfer system of this invention utilizes a wheeled frame assembly provided with a rearwardly facing three-point connection for a ground-working implement and a forwardly extending tongue for connection to a towing vehicle, and combines therewith an elongated flexible connector for interconnecting the forward end of the ground-working implement and the rearward end of the towing vehicle in such manner as to transfer the weight of the ground-working implement to the towing vehicle in a manner which minimizes forces tending to lift the rear end of the towing vehicle from the ground.

It is by virtue of the foregoing basic concept that the principal objective of this invention is achieved; namely, to overcome the aforementioned disadvantages and limitations of implement lifting mechanisms of the prior art.

A further object of this invention is to provide a weight transfer system of the class described which is of simplified construction for economical manufacture and is of rugged unitary design permitting severe treatment in use.

The foregoing and other objects and advantges of this invention will appear from the following detailed description taken in connection with the accompanying drawings of a preferred embodiment.

BRIEF DESCRIPTION OF THE DRAWINGS

FIG. 1 is a side elevation view of a two-way gang plow embodying the weight transfer system of this invention.

FIG. 2 is a side elevation view of the plow of FIG. 1 showing the plow assembly in a raised transport position.

FIG. 3 is a side elevation view of a plow utilizing another embodiment of the invention.

FIG. 4 is a fragmentary side elevation view of a plow utilizing still another embodiment of the invention.

DESCRIPTION OF THE PREFERRED EMBODIMENT

Referring to FIGS. 1 and 2 of the drawings, the weight transfer system of the present invention is used on a two-way gang plow having a roll-over plow assembly 10 comprising a plurality of left-hand and right-hand plow bottoms 12 carried by a mounting frame 14. The latter is supported for rotation on a main support frame 16 having a central upright standard 18 which mounts the power roll-over mechanism 20. The plow assembly thus is rotatable 180° between vertical plowing positions, as illustrated in FIG. 1, and a preferred horizontal transport position intermediate the vertical plowing positions. The intermediate position minimizes the lateral extent of the assembly for most convenient transport.

Laterally spaced pivots 22 on the frame 16 and one or more central pivots 22' on the standard 18 accommodate a conventional three-point connection. The latter includes a pair of laterally spaced lifting levers 24 connected pivotally at their rearward ends, by pivot pins 22, to the forward end of support frame 16 and at their forward ends pivotally to the axle 26 of a pair of laterally spaced support wheels 28. The lower end of an upright post 30 is mounted pivotally, by shaft 32, on each lever 24 intermediate the ends of the latter. An extensible power unit, such as the fluid pressure piston-cylinder unit 34 which preferably is of the hydraulic type, interconnects the upper end of each post 30 and the axle 26 or forward end of each lever 24.

In this latter regard, the shaft 32 may be provided by axle 26 and the lower ends of the piston-cylinder units attached pivotally to forward extensions of the levers 24, to achieve greater mechanical advantage for lifting the front end of the plow assemly. The arrangement illustrated is preferred for its reduction of stroke for the piston-cylinder units.

The plow is towed by a towing vehicle 36, such as a farm tractor, by means of a draw bar 38 which, in the embodiment illustrated, is freely pivotable from side to side to facilitate cornering. An elongated tongue 40 is joined at its forward end pivotally to he draw bar, by pin 42, and at its rearward end centrally to a transverse beam 44 extending between the posts 30. The beam 44 and posts 30 form a frame which is supported by the wheels 28 and to which the rearward end of tongue 40 is attached.

As previously mentioned, a link has been employed heretofore to interconnect the standard 18 and rearward end of tongue 40, to achieve elevation of the plow assembly for transport, upon operation of the piston-cylinder units 34. However, such arrangement operates adversely to lift the rear traction wheels of the towing vehicle.

In accordance with this invention, connector means is provided by which the weight of the plow assembly is utilized to counteract its normal tendency to lift the rear wheels of the vehicle.

Referring first to the embodiment illustrated in FIGS. 1 and 2, the forward end of an elongated flexible cable 46 is connected pivotally, by clevis pin 48, to the towing vehicle by means of a Z-shaped bracket 50 which is attached to the draw bar 38. The bracket is oriented to place the clevis pivot 48 above and coaxial with the pivot pin 42 of the tongue 40. The other end of the cable is connected adjustably to the plow assembly by means of one of a plurality of pins 22' located at the upper end of the standard 18. The cable passes under an idler pulley 54 which is attached to the rearward extremity of the tongue 40.

The cable is arranged so that it is relaxed when the hydraulic cylinders 34 are in the retracted position of FIG. 1, wherein the plow bottoms 12 are in ground-working position, and also when the cylinders are extended slightly to elevate the front end of the main frame 16 sufficiently to allow the plow bottoms 12 to place upward to the surface. Upon further extension of the cylinders the cable becomes tensioned, whereupon still further extension of the cylinders causes the main frame 16 to extend angularly upward in the rearward direction, as illustrated in FIG. 2. The pulley 54 forms a center about which the connecting pivot 22' rotates counterclockwise during upward extension of the frame 16.

Another embodiment of the present invention is shown in FIG. 3. In this case the cable 46a is longer than the cable 46 of the previous embodiment. A pulley 56 is attached to the upper end of the standard 18 and the cable is reversely bent around this pulley and returned to the center of axle 26, as illustrated, or to some other point which is also associated with the levers 24 and from which point the pulley 56 moves away during elevation of the frame 16. In place of the single idler pulley 54, three vertically spaced guide pulleys 58, 60 and 62 are mounted on a bracket extending upwardly from the rearward end of tongue 40. The cable then is fed through the passageway between the upper pulley 58 and central pulley 60, thence over the pulley 56 and back through the passageway between the central pulley 60 and the lower pulley 62 to the axle 26. Since the rearward end portion of the cable 46a is pulled upon by pulley 56 when the plow assembly is elevated, to effect tensioning of the cable, the latter is considered to be connected operatively to the plow assembly in a manner similar to the connection of the cable in FIGS. 1 and 2. The rest of the elements in this embodiment are the same as in the first embodiment.

Referring to FIG. 4, a third embodiment of the invention utilizes the series-connected arrangement of a length of cable 64 and an extensible fluid pressure piston-cylinder unit 66. The rearward end of cable 64 is attached to the upper end of standard 18 and its forward end is attached to one end of the piston-cylinder unit 66. The opposite end of the piston-cylinder unit is connected pivotally to the bracket 50, by pin 48.

In the operation of the present invention, referring first to the embodiment shown in FIGS. 1 and 2, the plow is shown in FIG. 1 in the operative, or plowing position. Hydraulic cylinders 34 are retracted, placing the lifting levers 24 in lowered position. In this orientation the plow assembly 10 is vertical with one set of bottoms 12 penetrating the ground for plowing.

To raise the plow assembly for transport the cylinders 34 are extended sufficiently to incline the main frame 16 slightly forward, whereupon forward movement of the plow asembly causes the bottoms 12 to plane to the surface. The plow assembly then is rolled over to its horizontal position, FIG. 2, by actuation of the roll-over mechanism 20. The plow assembly then is moved to its raised position by further extension of the hydraulic cylinders 34, pivoting lifting levers 24 further counterclockwise to their raised position, FIG. 2.

During elevation of the main support frame 16 and plow assembly, the tension on connector cable 46 exerts a rearward force on bracket 50, creating a clockwise moment on the draw bar 38 forcing the rear of the towing vehicle downwardly. Thus, the upward force on the towing vehicle caused by the weight of the raised plow assembly acting through the tongue 40 is counteracted and the towing vehicle remains substantially level, rather than being lifted upwardly as is the case in the prior art coupling systems.

The operation of the embodiment shown in FIG. 3 is substantially the same as that of the embodiment just described. The connector cable 46a is tensioned with less vertical elevation of the main support frame 16, than in the embodiment of FIGS. 1 and 2.

The embodiment of the invention shown in FIG. 4 allows manual adjustment of the degree of inclination of the plow assembly in the elevated, transport position, by selective extension or retraction of the piston-cylinder unit 66. The interconnection of post 30 and bracket 50 by the series arrangement of cable 64 and piston-cylinder unit 66 functions, in the manner of the previous embodiments, to create a clockwise moment on the draw bar 38, again forcing the rear of the towing vehicle downwardly.

In each embodiment the aforesaid procedure is reversed to place the plow element in its lowered position for resumption of plowing.

It will be apparent to those skilled in the art that various changes may be made in the size, shape, type, number and arrangement of parts described hereinbefore without departing from the spirit of this invention.

Having now described my invention and the manner in which it may be used, I claim:

1. In a coupling assembly for interconnecting a ground-working implement and a towing vehicle, wherein the coupling assembly includes a frame, a pair of laterally spaced transport wheels therefor, a pair of lifting levers connected pivotally to the frame and arranged for connection to laterally spaced positions on the implement for raising and lowering the implement, a towing tongue attached at its rearward end to the frame and arranged at its forward end for connection to a towing vehicle, and extensible power means operatively interconnecting each lever and the frame for pivoting the lever, the combination therewith of a weight transfer system comprising an elongated flexible connector having one end arranged for operative connection to a ground-working implement vertically above the connection of the levers to the implement and having its opposite end arranged for connection to a towing vehicle, the connector being proportioned to be tensioned as the levers lift the implement from the ground, whereby the weight of the implement creates a downward force at the point of connection of the connector to the towing vehicle, to counteract the upward force created by the weight of the implement to the point of connection of the tongue to the towing vehicle.

2. The combination of claim 1 wherein the connector comprises an elongated flexible cable.

3. The combination of claim 1 wherein the towing vehicle is provided with a laterally pivotable draw bar to which the towing tongue is arranged to be connected on a vertical pivot, and means is provided on the draw bar for connection of the connector on a vertical pivot coaxial with the vertical pivot of the tongue.

4. The combination of claim 2 including a pulley on the rearward end of the tongue engaging the cable intermediate its ends.

5. The combination of claim 2 including a pulley on the implement operatively engaging said one end portion of the cable, the terminal end of said one end portion being connected operatively to a point associated with the lever and from which point said pulley move away during elevation of the implement.

6. The combination of claim 1 wherein the connector comprises the series arrangement of an elongated flexible cable and an extensible fluid pressure piston-cylinder unit.

* * * * *